Feb. 6, 1968  A. ZEITLIN ETAL  3,367,163

APPARATUS FOR PRESSURIZING A LIQUID

Filed Oct. 27, 1964  4 Sheets-Sheet 1

INVENTORS.
ALEXANDER ZEITLIN &
JACOB BRAYMAN
BY Brumbaugh, Free,
Graves & Donohue
their ATTORNEYS

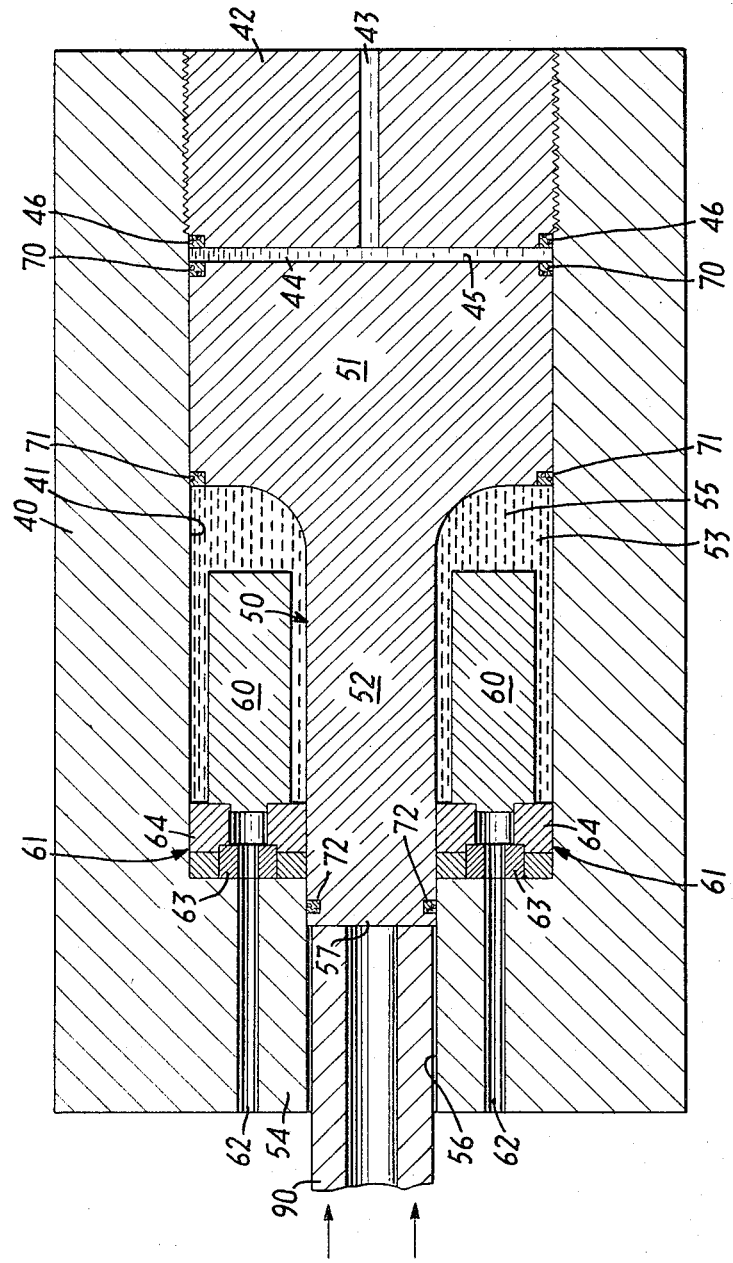

Feb. 6, 1968   A. ZEITLIN ET AL   3,367,163
APPARATUS FOR PRESSURIZING A LIQUID
Filed Oct. 27, 1964   4 Sheets-Sheet 3

INVENTORS.
ALEXANDER ZEITLIN &
JACOB BRAYMAN
BY Brumbaugh, Free,
Graves & Donohue
their ATTORNEYS

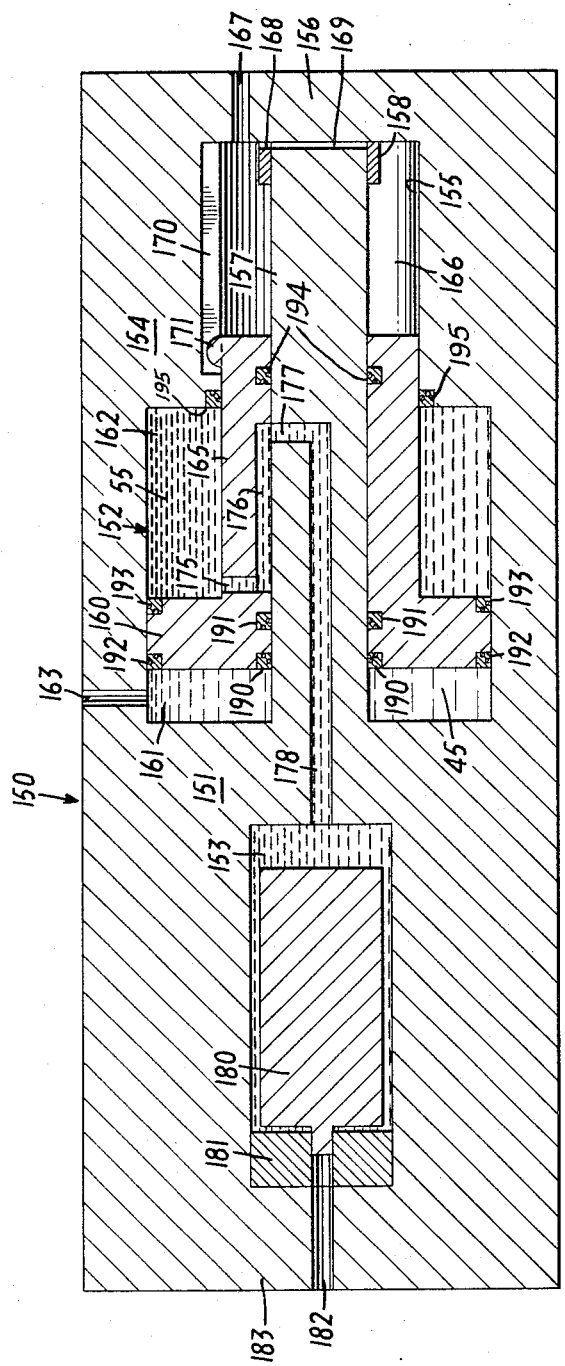

United States Patent Office 3,367,163
Patented Feb. 6, 1968

3,367,163
APPARATUS FOR PRESSURIZING A LIQUID
Alexander Zeitlin, White Plains, and Jacob Brayman, Staten Island, N.Y., assignors to Barogenics, Inc., New York, N.Y., a corporation of New York
Filed Oct. 27, 1964, Ser. No. 406,679
14 Claims. (Cl. 72—253)

ABSTRACT OF THE DISCLOSURE

Liquid pressurizing apparatus comprising a pressurizing chamber bounded at opposite ends by first and second closure means. The chamber is contractible between the ends by relative movement between the closure means. Press means are provided by which an actuating pressure is applicable to the first closure means and by which said chamber is so contractible with the aid of such pressure to impart hydrostatic pressure to a liquid in said chamber. Stem means extend from the first closure means through the chamber into aperture means in said second closure means. The first closure means and the stem means conjointly comprise pressure multiplier means to convert said actuating pressure into a greater hydrostatic pressure of said liquid. Seal means seal the aperture means against the hydrostatic pressure, and means are provided for utilizing the hydrostatic pressure.

This invention relates generally to apparatus for pressurizing a liquid and more particularly to apparatus of such sort which is useful for hydrostatic extrusion or pressure intensification or other like purposes.

For a better understanding of the invention, reference is made to the following description and to the accompanying drawings wherein:

FIG. 4 is a view in cross-section of exemplary apparatus embodying the invention, the cross-section being taken in a plane through the axis of the apparatus;

FIG. 7 is a view in cross-section of still further exemplary apparatus in accordance with the invention.

Figure 1:
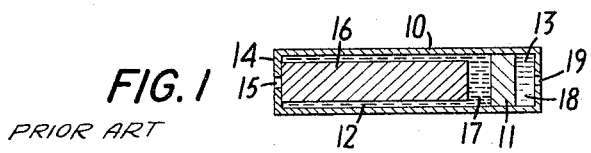
FIGS. 1–3 are schematic diagrams of various pressurizing schemes, the diagrams providing a background for the present invention.

Referring now to FIG. 1, a cylindrical container 10 has therein a sliding plunger 11 by which the interior of the container is divided into a forward pressurizing chamber 12 and a rear hydraulic chamber 13. The front end closure 14 of container 10 provides a die and an extrusion passage 15 for a billet 16 received in chamber 12 and surrounded therein by a liquid medium 17. The liquid 17 is pressurized by a driving forward of plunger 11 by pressurized hydraulic fluid 18 injected into chamber 13 through a rear passage 19. When liquid 17 is so pressurized, it applies hydrostatic pressure to billet 16 so as to theoretically force the billet material through passage 15 and thereby form an extrusion.

In FIG. 1, the billet 16 has unit volume, and the cross-sectional area $a$ of the passage 15 is fixed by the use intended for the extrusion. The cross-sectional area A of the billet is chosen to yield a selected value greater than 1.0 for the extrusion ratio $A/a$. For unit volume billet and a fixed $a$, the length of the billet varies inversely with the value of the extrusion ratio.

In order for plunger 11 to fully extrude the unit volume of billet 16, the plunger must generate over its stroke a cubic displacement which, as a practical matter, is necessarily somewhat greater than unit volume (to allow for some compressibility of liquid 17 and some leakage thereof through passage 15), but which may be assumed as sufficient if equal to one unit volume. Such cubic displacement of the plunger is equal to the product of it stroke S and the plunger's cross-sectional area $A_1$ which is assumed as being the same as that of the billet chamber 12. The quantities $A_1$, and S may be varied inversely while continuing to yield a cubic displacement of 1.0 Therefore, the FIG. 1 device could be constructed either as a "short" device having a relatively short stroke and a relatively large value of $A_1$ or as a "long" device having a relatively long stroke and a relatively small value for $A_1$.

As a rule of thumb, the cost of a hydrostatic extrusion device varies linearly with its length but roughly as the square of its chamber area. Therefore, in the FIG. device, economy is served by reducing $A_1$ to the smallest value which will accommodate the cross-section A of the billet while commensurately lengthening the stroke S of the plunger so that its cubic displacement continue to be one unit volume. In practice, $A_1$ must be slightly greater than A in order to permit a jacket of liquid 1 to form around the billet. For present purposes, however it is assumed that $A_1$ can be made equal to A. Under that assumption and the others previously made, the stroke S needed to fully extrude the billet is equal to the length of the billet. Hence, the FIG. 1 device may be termed a full billet stroke device.

The FIG. 1 device, if practical, would have the advantage that, for a unit volume billet, a fixed value for $a$ and a selected extrusion ratio $A/a$, the device permit the greatest economy in the construction cost of the apparatus to be realized. Moreover, since the device itself and the stroke of plunger 11 can both be indefinitely long, further economies in construction cost can be realized by (a) shaping the unit volume billet to have the smallest cross-section A which will yield a practical value for the extrusion ratio $A/a$, (b) commensurately lengthening the billet so that it still has unit volume (c) in correspondence with those changes in the billet reducing the cross-sectional area $A_1$ of the plunger and of the billet chamber to match the reduced billet cross section A, and, further, increasing the length of the device and the stroke S of the plunger so that such stroke matches the increased length of the billet.

Unfortunately, the FIG. 1 device has little or no practical use as a hydrostatic extruder because it is incapable of developing in liquid 17 the hydrostatic pressure which is necessary to produce extrusion of all but the very softest materials. That is, because the pressure $P_h$ which can be generated for hydraulic fluid 18 by conventional hydraulic pumps is limited to about 30,000 p.s.i., and because plunger 11 acts as a 1:1 pressure transmitter rather than as a pressure multiplier, the maximum pressure $P_m$ obtainable in liquid medium 17 is likewise limited to about 30,000 p.s.i. Such pressure value is, however much too low for most hydrostatic extrusion applications which often require a pressure $P_m$ on the order of 400,000–450,000 p.s.i.

Figure 2:
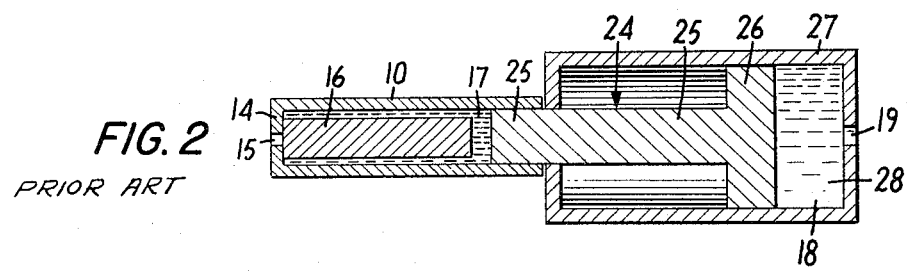

The pressure $P_m$ can be increased above 30,000 p.s.i. by the use of the FIG. 2 device which, like FIG. 1, is an extruder characterized by a stroke approximating the full length of the billet. In FIG. 2, the container 10 has a rear opening and the plunger 11 is replaced by a pressure multiplier 24 comprised of a stem 25 received in tha opening and a piston 26 slidably received in the bore of a hydraulic cylinder 27. The multiplier 24 is driven forward to pressurize liquid 17 by the injection of hydraulic fluid 18 into a chamber 28 formed within cylinder 27 behind the piston. The multiplier converts the pressure $P_h$ of fluid 18 into a pressure $P_m$ of liquid 17 which is equal to $$P_h(A_2/A_1)$$

where $A_2$ is the cross-sectional area of the piston and $A_1$ is the cross-sectional area of the stem. The pressure multiplying ratio is greater than unity and, within practical limits can be made as great as desired. Thus, despite the fact that $P_h$ is restricted to a maximum of about 30,000 p.s.i., the pressure $P_m$ can be made substantially greater.

The applications of the FIG. 2 device are, however, limited because of the following considerations.

Evidently, the stroke of the multiplier 24 can be no greater than the length of stem 25. Hence, in order for the stroke to equal the length of the billet, the stem 25 must be at least as long as the billet. The pressure $P_m$ axially loads such a long stem or column to tend to bend the column. In such circumstances, the column will fail by buckling if its length reaches a critical limit $l_{max.}$ which is given by Euler's formula as:

$$l_{max.} = \frac{\pi}{2}\sqrt{\frac{EI}{T}}$$

where E is the Young's modulus of the column material, I is the polar moment of inertia of the column, and T is the applied axial load or tonnage. Hence, because the FIG. 2 stem is subjected to Euler column bending by the pressure $P_m$, it is necessary to maintain $P_m$ below a value at which $l_{max.}$ equals the stem length which, in turn, must be as long as the billet in order to permit a stroke as long as the billet. The practical consequence of such limitation on the value of $P_m$ is that, given a unit volume billet comprised of a particular material and providing a particular extrusion ratio, $A/a$, the maximum pressure which $P_m$ can have without buckling the stem may be insufficient to extrude the billet.

The difficulty just described can be overcome on occasion by increasing the extrusion ratio of the unit volume billet and correspondingly shortening the billet length so as to permit the multiplier stroke and the stem length to be commensurately decreased. It may not, however, be desirable to increase the extrusion ratio, and the consequent increase (for a fixed value of $a$) in chamber and billet cross-sections results in increased cost of the equipment. It is greatly preferable for economy reasons to change the extrusion ratio in the opposite direction, but the occurrence of an Euler column bending effect on the multiplier makes it either difficult or impossible with prior art full billet stroke devices to realize high pressure hydrostatic extrusion at the lowest practical extrusion ratios.

Figure 3:
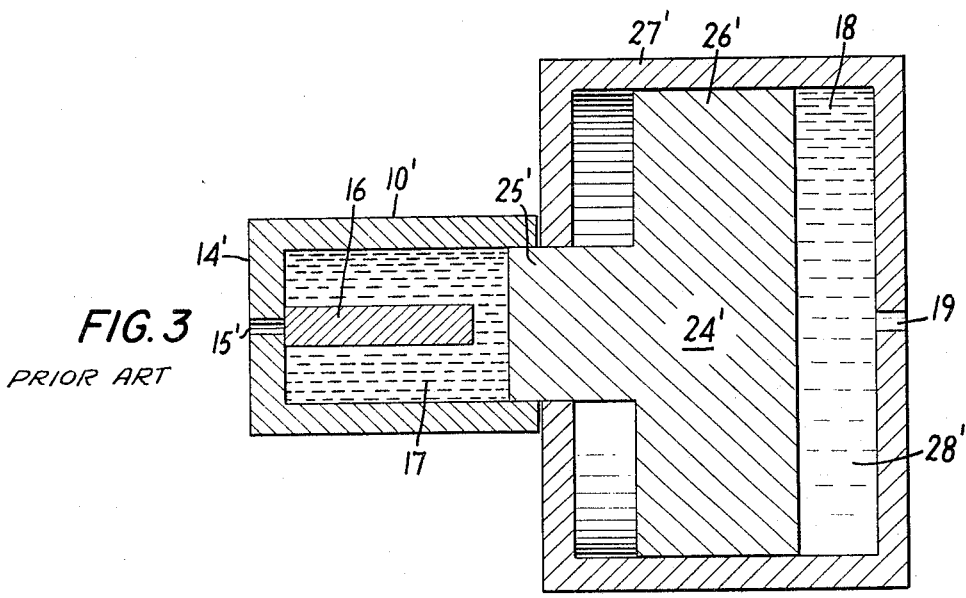

An alternative to the FIG. 2 device is the fractional billet stroke device which is shown by FIG. 3 and of which the principle is disclosed in U.S. Patent 3,126,096 issued March 24, 1964. As indicated by the use in FIG. 3 of reference numerals which are "primes" of the ones in FIG. 2, the elements of FIG. 3 are counterparts of those in FIG. 2 and, hence, need not be described in detail. The FIG. 2 structure and the FIG. 3 structure are differently dimensioned in that, in FIG. 3, the stem of the multiplier is shorter than the billet, and the cross-sectional areas of the stem, billet chamber and piston are increased to yield the same pressure multiplying ratio as before and to compensate for the loss from the shortened stem in the cubic displacement of the multiplier. By so suitably shortening the stem and increasing the cross-sectional dimensions of the multiplier, the stem length can be made less than the Euler critical limit $l_{max.}$ for high values of $P_m$. Hence, the FIG. 3 scheme enables hydrostatic extrusion to be practiced at low extrusion ratios and high hydrostatic extrusion pressures. The scheme, however, has the disadvantage that it greatly increases the cost of the equipment because, as stated, cost varies roughly as the square of the cross-sectional area of the chamber space of the extruder.

An object of this invention is to provide apparatus which is free of the above-noted disadvantages.

Another object of this invention is to provide for conversion by a pressure multiplier of a lower pressure into a higher pressure in a manner whereby the stroke of the multiplier is not limited by Euler column bending due to the higher pressure.

A further object of the invention is to provide for a conversion of the sort just described wherein the stroke of the multiplier may exceed its axial length.

Another object of the invention is to minimize the cost of hydrostatic extrusion apparatus or other liquid pressurizing apparatus.

A further object of the invention is to provide for hydrostatic extrusion of a billet at high pressure by application of a smaller actuating tonnage than would have been required by the prior art.

These and other objects are realized according to the invention in the manner exemplified by the embodiments of the invention which are hereinafter described.

Referring to FIG. 4, a cylindrical casing 40 has therein a cylindrical bore 41 closed at its right hand axial end by an end closure 42. The casing 40 may be composite casing constructed in the manner taught in copending application Serial No. 356,171, filed March 31, 1964, now Patent No. 3,278,993, and owned by the assignee hereof. While closure 42 is shown as being a simple plug threadedly received in the bore, the closure may be one of those disclosed in U.S. Patent No. 3,063,594. A passage 43 through the closure provides an inlet to a hydraulic chamber 44 for pressurized hydraulic fluid 45 injected through the passage into the chamber. A seal device 46 on closure 42 prevents or minimzes leakage of fluid 45 from the chamber through the interface between the closure and the casing 40. The chamber 44 provides a press means for actuating the FIG. 4 apparatus.

The front of chamber 44 is closed by the rear of a pressure multiplier 50 received in axial slidable relation within bore 41 and comprised of a rear piston 51 and a forward cylindrical stem 52. Ahead of piston 51, the bore 41 provides a pressurizing chamber 53 closed at its left hand axial end by an end closure 54 and at its right end by piston 51 which acts as a movable end closure. The chamber 53 is shown in FIG. 4 as containing a liquid medium 55 adapted to develop a high hydrostatic pressure $P_m$ by the driving forward of multiplier 50 by the hydraulic pressure $P_h$ of the fluid 45 in chamber 44. The liquid 55 surrounds stem 52 which axially extends from piston 51 through chamber 53 into a central cylindrical aperture 56 formed in end closure 54. The function of aperture 56 is to relieve the front end 57 of stem 52 from the high pressure in chamber 53 so as to permit the average axial pressure in that front end to be less than the pressure $P_h$. By appropriate design, that function may be performed whether aperture 56 is open or closed at its left hand end and whether stem 52 terminates in the aperture or passes therethrough to project outwardly from casing 40.

In the FIG. 4 device now being described, stem 52 is surrounded by a plurality of separate cylindrical billets 60 contained in chamber 53 so that each billet is jacketed by the liquid 55. The front end of each billet is positioned against a die means 61 disposed inside of and in fixed positional relation with closure 54. Extending through die means 61 and closure 54 is a separate extrusion passage 62 for each billet. The die means 61 may be comprised of primary and secondary dies 63 and 64 in the manner taught in U.S. Patent No. 3,126,096, there being one such primary die and one such secondary die for each billet.

Leakage of hydraulic fluid 45 from chamber 44 into the interface between piston 51 and the wall of bore 41 is prevented or minimized by a seal device 70 on the piston. Similar seal devices 71 and 72 are utilized for the high pressure liquid in chamber 53, device 71 being a seal against leakage of such liquid into the piston-bore interface, and device 72 being a seal against loss of pressure of liquid 55 by leakage thereof out of aperture 56.

Figure 4A:
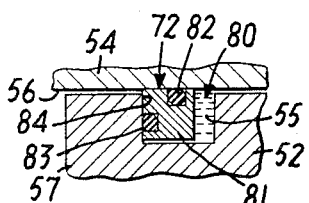
FIG. 4A is a fragmentary view is cross-section of a detail of the FIG. 4 apparatus.

Each of seal devices 46 and 70–72 may be of the type which is disclosed in U.S. Patent No. 3,156,475 granted November 10, 1964. Referring to FIG. 4A which, specifically, is a view of device 72 but which shows a structure exemplary of that of the other devices 46 and 70, 71, an annular notch 80 is formed in the front end of stem 52. In this notch is received a metal ring 81 which is a carrier for a first "O" ring 82 on the radially outer surface of ring 81 and a second "O" ring 83 on the axial side of ring 81 away from the source of high pressure liquid 55. The "O" rings 82 and 83 are so disposed on carrier ring 81 that the pressure $P_m$ subjects the device 72 to both a net radially outward pressure and a net axial pressure directed away from chamber 53. Ring 81 responds to the net radial pressure to radially expand so as to squeeze "O" ring 82 against the inner wall of aperture 56 and so as to produce pressure contact between ring 81 and that wall. Concurrently, ring 81 responds to the net axial pressure thereon to squeeze "O" ring 83 against the registering wall 84 of notch 80 and to produce a pressure contact between ring 81 and wall 84. In this way, neither of "O" rings 82 and 83 "sees" any clearance into which it can be driven by pressure $P_m$, wherefore the device 72 is adapted to seal against a hydrostatic pressure as great as 400,000 to 450,000 p.s.i.

In lieu of device 72 being radially expandable in response to pressure, it may be a radially contractable device. That is (FIG. 4B), notch 80 may be formed in closure 54 at the opening of aperture 56 into chamber 53, and "O" ring 82 may be carried on the radially inner surface of ring 81 instead of on the radially outer surface thereof. When the seal device is so modified, the ring 81 responds to the applied pressure to radially contract ring 81 so as to force "O" ring 82 against the exterior surface of stem 82 and to produce pressure contact between ring 81 and that exterior surface. Otherwise the radially contractable seal means of FIG. 4B works the same way as the radially expandable seal means of FIG. 4A.

As an optional feature, the front end 57 of stem 52 may have a pressure force exerted therein by a pusher 90 driven by, say, a hydraulic ram (not shown). While the pusher is shown as being in the form of a hollow tube, it may also be a solid rod. The pressure force exerted by the pusher provides over the effective area of the front end of the stem an average axial counter-pressure $P_c$ less than $P_h$.

In operation, the pressure $P_h$ of hydraulic fluid 45 drives multiplier 50 forwardly to impart a hydrostatic pressure $P_m$ to the liquid 55. The forward pressure force on the multiplier is $P_h A_2$ where $A_2$ is the effective area of piston 51 over which $P_h$ acts axially. Assuming that the counter-pressure $P_c$ on stem 52 is atmospheric or can otherwise be neglected, the effective area $A_1$ over which reverse axial pressure can act on the multiplier is equal to $A_2 - A_3$ where $A_3$ is the effective cross-sectional area of the stem 52. Thus the reverse pressure force on the multiplier is $P_m A_1$, wherefore (neglecting acceleration forces on the multiplier), $P_m$ equals $P_h(A_2/A_1)$. Since $A_1$ is less than $A_2$, $A_2/A_1$ is greater than 1. Therefore, $P_m$ is greater than $P_h$.

By suitably proportioning the diameter of stem 52 relative to the diameter of piston 51, the pressure multiplying ratio $A_2/A_1$ can, within practical limits, be made any value desired so that the FIG. 4 device can without difficulty convert a hydraulic pressure $P_h$ of 30,000 p.s.i. or less a pressure $P_m$ of, say, the order of 400,000 p.s.i. and of great enough order to hydrostatically extrud billets 60 through passages 62. If desired, initiation c extrusion can be aided by a transient supplemental pres sure in the manner disclosed in copending application Sei ial No. 236,602, filed November 9, 1962, now Patent Nc 3,181,328 and owned by the assignee hereof.

Since stem 52 is not subjected to any significant axi; pressure at its front end 57, the stem 52 is substantiall free of any Euler column bending and is much long€ than what would be the Euler critical limit for its lengt if the area of its front end were to be subjected to th pressure $P_m$. The axial dimension of piston 51 may, witl in reasonable limits, be made as small as desired relativ to its diameter so that piston 51 is also free of any sign ficant Euler column bending. Moreover, all of piston 5 fits within bore 41 so as not to be limited to a stroke le: than or equal to the axial length of the piston. Therefor€ within practical limits set by design considerations othe than Euler column bending, stem 52 may be made ir definitely long, and the lengths of casing 40 and of billel 60 and the stroke of multiplier 50 may all be correspond ingly elongated to provide a hydrostatic extrusion devic in which the displacement of the hydrostatic liquid 5 is effected primarily by a long stroke of the multiplie rather than by a relatively large effective cross-section; area of the multiplier. The long stroke does not impos any restriction on the pressure-multiplying ratio whic can be made very large by having the diameter of th stem approach closer and closer to that of the piston.

As compared to the FIG. 1 scheme, the FIG. 4 appar; tus is a practical hydrostatic extruder because it is capabl of providing the pressure multiplication necessary to effec the extrusion of hard materials. In contrast to the FIG. scheme, the FIG. 4 apparatus is not limited by Eule column bending, wherefore (and assuming unit volum of billet material is to be extruded through a die openin of fixed cross-section area $a$), the FIG. 4 apparatus pei mits the extrusion ratio and the pressure $P_m$ to be varie independently of each other. Further, the FIG. 4 appar; tus differs from both the FIG. 2 scheme and the FIG. scheme in that a given volume of billet material (e.g unit volume) can be extruded by a FIG. 4 apparatu which is of lower tonnage (and of correspondingly low€ construction cost) than that which would characteriz a FIG. 2 device or FIG. 3 device capable of extruding th same volume. In particular, for the same extrusion c; pacity, the FIG. 4 apparatus may be of much lowe tonnage (and cost) than the apparatus of FIG. 3.

While stem 52 is not subject to any Euler effect, it i subject to tensile stress produced by the Poisson effect a a result of the radial pressure of the liquid 55 on the sten If such tensile stress becomes high enough, the stem ma rupture due to a "pinch-off" effect which has been d€ scribed by P. W. Bridgman. Therefore, it is desirable i some applications of the invention to apply to stem 52 b pusher 90 an axial counter-pressure sufficient to reduc the tensile stress in the stem to a value less than that ; which rupture would occur by Bridgman pinch-off. I order for the combination of stem 52 and piston 51 t continue to act as a pressure multiplier, the average valu of such a counter-pressure over the cross-sectional are $A_3$ of the stem must be less than $P_h$. On the other hanc because the face area of pusher 90 which applies pre: sure is less than area $A_3$, that applied pressure may b greater than $P_h$ so long as the average value of counter pressure over all of $A_3$ is less than $P_h$.

Since the billets 60 are extruded by relative move ment between the multiplier 50 and the casing 40, eithe the multiplier or the casing may be fixed relative to th foundation or frame (not show) for the apparatus. Whil€ in FIG. 4, the direction of extrusion relative to the casin is the same as the direction of movement of the mult plier relative to the casing, by appropriate modificatio of the apparatus (in the manner taught in U.S. Paten ,126,096), the directions relative to the casing of the extrusion and of the multiplier movement may be made opposite to each other.

Figure 4B:
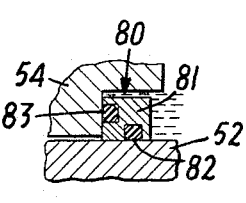
FIG. 4B is a fragmentary view in cross-section of a modification of the detail of FIG. 4A.

The FIG. 4 apparatus is an annular extruder in the sense that the stem means for the multiplier is centrally disposed in the cross-section of chamber 53 and the several billets are disposed in an annular configuration around that stem means. The apparatus may be converted into a central extruder by (a) replacing the single central stem rod by a plurality of axial stem rods extending from piston 51 through chamber 53 into respective ones of passages 62 (which may be enlarged in cross-section to accommodate stem rods having a cross-section the same as that, say, of the shown billets 60), (b) replacing the dies or the passages 62 by seal devices analogous in structure, disposition and operation to the device of FIG. 4A or that of FIG. 4B, (c) substituting for the central aperture 56 a single central extrusion passage provided with appropriate die means at the opening of the passage into chamber 53, (d) replacing the plurality of shown billets by a single billet disposed centrally within chamber 53 to be extrudable through the said central passage.

The FIG. 4 apparatus may also be converted into a tubular extruder by (a) replacing the plurality of separate passages 62 by a single annular passage encircling aperture 56, (b) modifying the die means 61 to provide an annular die opening, and (c) substituting for the separate solid billets 60 a single tubular billet encircling the stem 52. FIG. 4 is illustrative of such a tubular extruder as well as the previously described rod extruder. For tubular extrusion, the portion of end closure 54 between the annular extrusion passage and aperture 56 provided a hollow central support column for the portion of the die means radially inwards of the extrusion passage. Such support column may be fixedly mounted leftward of the casing to the frame or other foundation (not shown) for the apparatus. In that case, pressure $P_m$ would tend to produce Euler bending of the column, but the column may nonetheless be safely made quite long because it has a larger polar moment of inertia I than, say, stem 52. As an alternative, the problem of Euler bending may be rendered moot by making the central column integral with stem 52 (aperture 56 and seal device 72 can then be dispensed with) such that the resulting front end stem structure and the radially inward portion of the die means move together with the multiplier when it is driven leftward by the pressure $P_h$.

In lieu of being used as an extruder, the FIG. 4 apparatus may be employed as merely a pressure intensifier. That is, billets 60 and die means 61 may be eliminated and end closure 54 made blind except for one passage 62 providing an outlet for the high pressure liquid in chamber 53. The liquid forced through that passage may, for example, be conducted by a high pressure conduit to a separate container chamber for a billet adapted to be hydrostatically extruded by the liquid.

Figure 5:
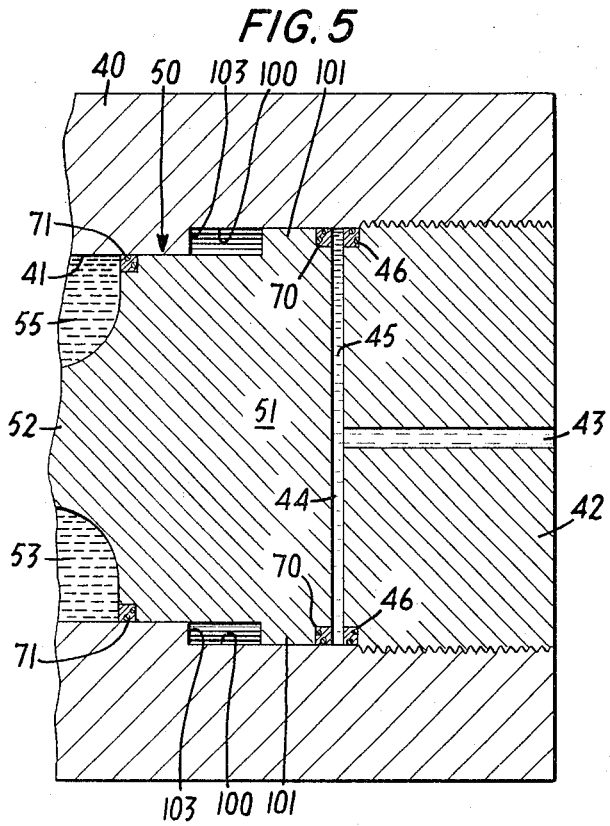
FIG. 5 is a view in cross-section of a modification of the FIG. 1 apparatus.

FIG. 5 is a modification of the FIG. 4 apparatus wherein the described pressure multiplication provided by piston 51 and stem 52 is supplemented by an additional pressure multiplying effect. In FIG. 5 the right hand end of bore 41 has a radial enlargement 100, and the right hand end of piston 52 is correspondingly enlarged by a radial flange 101. The effect of such right hand enlargement of the bore and piston is to multiply the pressure $P_h$ in chamber 44 by the ratio $A_4/A_2$ where $A_4$ is the effective area of the piston's rear face over which $P_h$ acts axially, and $A_2$ is, as before, the effective area for forward axial pressure of the portion of piston 51 within the unenlarged section of bore 41. Thus, in FIG. 5, the total pressure-multiplying ratio is $(A_4/A_2)(A_2/A_1)$ so that the pressure $P_m$ of the liquid 55 in chamber 53 is equal to $P_h(A_4/A_1)$. The press means for the FIG. 5 apparatus need not be hydraulic but may, instead, be, say mechanical.

In the FIG. 5 apparatus, the stroke of multiplier 50 is limited by the coming into contact of flange 101 with the shoulder 103 formed at the junction of bore enlargement 101 with the unenlarged section of bore 41. To state it another way, the stroke of the multiplier is limited to less than its axial length. Moreover, if the unenlarged portion of the piston and the enlarged portion of the bore are both elongated in order to lengthen the stroke of the multiplier, the problem of Euler bending reasserts itself as a tendency of the column provided by the elongated piston to bend under the pressure $P_m$ in chamber 53. That problem is, however, minimized by the fact that $P_m$ dissipates into the relatively large diameter of the piston to thereby become equivalent to a bending pressure of about the same value as $P_h$. In many applications, the restriction that the FIG. 5 apparatus cannot have an indefinitely long stroke is outweighed by the consideration that the stem diameter may be reduced relative to that of FIG. 4 while obtaining an overall pressure multiplication the same as that of FIG. 4 so as, thereby, to make more cross-sectional room in chamber 53 for the billets. Thus, the FIG. 5 system on occasion is preferable to the FIG. 4 system in that, at the small additional cost involved in providing an enlargement in the low-cost low-pressure section of the apparatus (to the right of shoulder 103), a substantial increase may be obtained in the extrusion capacity of the high-cost high-pressure section of the apparatus (to the left of seal means 71).

Figure 6:
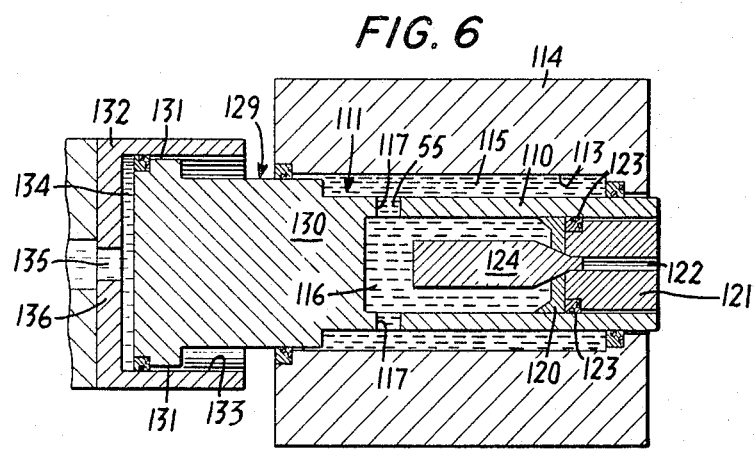
FIG. 6 is a cross-section of a further exemplary apparatus in accordance with the invention, the cross-section being taken through the axis of the apparatus.

The FIG. 6 embodiment is adapted to provide rod extrusion of a central billet through die means which has no support post or column subject to Euler column bending. The FIG. 6 system differs from that of FIG. 4 and FIG. 5 in that the stem means 110 for the multiplier 111 is in the form of a tubular sleeve by which the bore 113 inside casing 114 is divided into a primary chamber 115 outside the stem and a secondary chamber 116 inside the stem. The liquid 55 inside bore 113 is flowable from chamber 115 to chamber 116 through radial ports 117 in sleeve stem 110. Ports 117 have a throttling effect on the passage of the liquid, the degree of throttling being a function of port size. Thus a selected throttling of the liquid may be obtained by appropriate selection of the size of the ports. The described throttling effect is advantageous because it permits control over the speed of extrusion of the billet.

The right hand or front end of chamber 116 is closed by a die means 120 secured to the interior of stem sleeve 110. Attached to the die means is a short support column 121 which backs the die means to prevent deflection thereof under the pressure $P_m$ in the bore 113. A central extrusion passage 122 passes through die means 120 and support 121. A seal device of the type shown by FIG. 4A is carried by column 121 and prevents or reduces leakage of liquid from chamber 116 through the interface between the column and sleeve 110. Other seals of the FIG. 4B type are disposed at the ends of chamber 115. A billet 124 is shown as being mounted in chamber 116 over the entrance to passage 123.

The liquid in bore 113 is pressurized by the multiplier 129 comprised of stem 110 and of a piston 130 at the rear of the stem. As in the case of FIG. 5, the rear end of the piston is radially enlarged by a flange 131 to provide a pressure-multiplying effect supplementing that provided by the piston-stem combination. The press means for multiplier 129 comprises a casing 132 having a bore 133 in which flange 131 is slidably received. The bore 133 provides behind piston 130 a hydraulic chamber 134 for which the piston forms a movable end closure. Multiplier 129 is driven forward by pressurized hydraulic fluid injected into chamber 134 through a passage 135 in the rear closure 136 for casing 132.

The driving forward of multiplier 129 converts the hydraulic pressure $P_h$ in chamber 134 into a higher pressure $P_m$ of the liquid 55 in the outer pressurizing chamber 115. The pressurized liquid then passes in a throttled manner through ports 117 into inner chamber 116. Within that inner chamber, the liquid applies to billet 124 a hydrostatic pressure by which the billet material is extruded as a rod through the die means 120 and the extrusion passage 122. In the course of extrusion, the elements 120–123 move with the multiplier.

An advantage of supporting the die means 120 by stem 110 is that to do so eliminates the need for an exteriorly mounted die support post or column which would be subject to Euler column bending by the pressure $P_m$.

As so far described, the multiplier 129 and the casing means 114, 132 are, respectively, movable and stationary relative to the foundation or frame (not shown) for the apparatus. As an alternative, (a) the apparatus is turned through 90° so that passage 122 opens downward, (b) multiplier 129 is secured on opposite sides of passage 122 at the then downward end of support 121 to the main frame (not shown) of the apparatus, (c) casings 114 and 132 are coupled together through a movable subframe or other appropriate means (not shown) to form a casing structure which is upwardly movable relative to stationary multiplier 129, (d) the pressure $P_h$ in chamber 134 operably forces the casing structure upward to thereby develop the pressure $P_m$ in bore 133. The advantages of such alternative are that the exterior opening of extrusion passage 122 is stationary, and that the weight of the apparatus automatically provides a counter-pressure opposing rupture of sleeve 110 by the Bridgman pinch-off effect. When the described alternative is employed, the mentioned main frame and movable subframe may be constructed in accordance with the teachings of the aforementioned application Serial No. 356,171.

Apart from the above-discussed differences between the FIG. 6 system and those of FIG. 4 and FIG. 5, the foregoing description of the FIG. 4 and FIG. 5 systems and their variants are applicable to the FIG. 6 apparatus. Thus, for example, piston 130 may be like piston 51 (FIG 4) to permit an indefinitely long stroke of the multiplier, extrusion of the billet material may be in a direction which is the same as or opposite to the direction of movement of multiplier 129 relative to casing 114, casing 114 and/or casing 132 may be constructed in accordance with the teachings of the aforementioned application Serial No. 356,171, and so on.

FIG. 7 is an embodiment of generic aspects of the invention. In the FIG. 7 apparatus, the chamber in which liquid 55 is pressurized need not be of large enough diameter to accommodate both the stem means for the multiplier and one or more billets. Moreover, in the FIG. 7 apparatus, a variable throttling effect is obtainable.

In FIG. 7, an outer cylindrical casing 150 is divided by a partition 151 into a right hand bore 152 and a left hand cylindrical chamber 153. The right hand end of bore 152 is closed by an end closure 154 having therein a cylindrical aperture 155 extending rightward from the bore and closed at its right end by a web 156. A central cylindrical post 157 of smaller diameter than aperture 155 extends from partition 151 into the aperture to a termination just short of web 156. The right hand end of post 157 is maintained in axial alignment by a close fitting collar 158 encircling the post and attached to the web. Because the post end is not connected to the web, the post is axially deformable independently of the axial deformation of casing 150.

Post 157 provides a central support for an annular piston 160 received in bore 152 and axially slidable on the post within the bore. Piston 160 divides bore 152 into a left hand hydraulic chamber 161 and a right hand pressurizing chamber 162. Pressurized hydraulic fluid 45 is injected through passage 163 into chamber 161 for the purpose of driving piston 160 forward to impart hydrostatic pressure to liquid 55 in chamber 162. A pressure-multiplying effect is obtained by a stem in the form of a sleeve 165 fitting slidably around post 157 and extending from piston 160 into the annular space 166 defined in aperture 155 between the post 157 and the bounding wall of the aperture. To counteract Bridgman pinch-off effect, hydraulic fluid under less pressure than that in chamber 161 may be injected through passage 167 in web 156 into space 166, some of such fluid passing through port 168 in collar 158 into the gap 169 between the web and the right hand end of post 157. Piston 160 is prevented from rotating within casing 150 by a key 171 projecting from the end of sleeve 165 into an axial keyway 170 formed in the wall of aperture 155.

Sleeve 165 has therein a port 175 by which pressurized liquid 55 in chamber 162 may flow from that chamber into an axial throttling groove 176 formed in the wall of the central bore of the sleeve. The groove 176 rides over a fixed size opening 177 for a passage 178 leading from opening 17 through post 157 and partition 151 to chamber 153. Over its axial length, the groove 176 varies in angular width (i.e., width around the inner wall of the sleeve bore) from a maximum size matching the maximum angular dimension of opening 177 to a minimum size substantially less than that dimension.

Chamber 153 is shown as containing a billet 180 jacketed by liquid 55. The front end of the billet is positioned against a die means 181. An extrusion passage 182 extends through the die means and through the left hand end closure 183 for the chamber 153.

The piston 160 carries for sealing purposes a pair of inner seal devices 190, 191 of the radially contractable type (FIG. 4B) and a pair of outer seal devices 192, 193 of the radially expandable type (FIG. 4A). Sealing is accomplished between stem 165 and post 157 by seal device 194 and between the stem and end closure 154 by seal device 195, both devices 194 and 195 being of the radially contractable type (FIG. 4B).

In operation, the pressure $P_n$ in chamber 161 is converted in the manner heretofore described, into a greater pressure $P_m$ by the pressure-multiplier comprised of piston 160 and sleeve stem 165. As the multiplier is driven forward, the pressurized liquid flows through port 175, groove 176, opening 177 and passage 178 into chamber 153. Because groove 176 is of variable angular width over its axial length and because the piston displacement positions different successive axial portions of groove 176 over opening 177, the flow of pressurized liquid from chamber 162 to chamber 153 is throttled as a function of the linear displacement of the piston. When the liquid reaches chamber 153, the hydrostatic pressure thereof causes billet 180 to be extruded through die means 181 and passage 182.

An advantage of the FIG. 7 apparatus is that it provides central extrusion of the billet material from a stationary opening (the outlet of passage 182) in a casing which need not be of a diameter to accommodate both the multiplier and one or more billets in the same chamber. Therefore, the FIG. 7 apparatus can be constructed at less cost than apparatus wherein both one or more billets and the multiplier must be accommodated within the same axial section of the casing. Also the variable throttling feature of the FIG. 7 system permits control over the speed of the extrusion as a function of the stage which the extrusion has reached.

The construction, dimensioning and operating parameters of apparatus according to the invention are variable in dependence on the intended application of the apparatus. As a concrete example, however, for purposes of extruding a 2" x 18" billet of S.A.E. 1020 mild steel, the FIG. 6 apparatus is constructed of high strength H11 steel and has an outer diameter of 18" and an axial length of 40", the casing being comprised of a pre-stressed inner liner and an outer cylinder, and the pressures $P_h$ and $P_m$ being 30,000 p.s.i. and 100,000 p.s.i., respectively.

The above-described embodiments being exemplary only, it is to be understood that additions thereto, modifications thereof and omissions therefrom can be made without departing from the spirit of the invention, and that the invention comprehends embodiments differing in form or detail from those specifically described herein. For example, in FIG. 7 the groove 176 may be of constant angular width, and a variable throttling obtained in an externally controlled manner by a rotatable control rod (not shown) passing leftwardly from the right hand end of the apparatus through central bores in web 156 and post 157 into passage 178, the head of the rod being disposed (within the passage) opposite the downward end of opening 177 and being shaped so that rotation of the rod varies the rate at which pressurized liquid 55 escapes from such downward end past the head into the passage, and the rod carrying near to or on its head a seal device of the radially expandable type (FIG. 4A) which prevents escape of the pressurized liquid between the rod and the wall of the rod-receiving bore in post 157. As another example, the FIG. 7 apparatus may be adapted for tubular extrusion by appropriately modifying the shape of die means 181 and passage 182 and by carrying the radially inward part of the die means on an axial column connected at its right hand end to partition 151 and at its left hand end to an external support spaced away from casing 150, the column being of lesser diameter than chamber 153 and being long enough axially leftward of passage 182 to accommodate the full length of the extrusion, and passage 178 being re-routed to have an opening into chamber 153 which is radially outward of the right hand end of the die support column. While, for conciseness, the present disclosure does not include a discussion of certain conventional constructional details of the embodiments of FIGS. 5-7 (such as the means for inserting billets), those details can be readily supplied by one skilled in the art from the teachings of the aforementioned patents and patent applications and from the knowledge of the prior art.

Accordingly, the invention is not to be considered as limited save as is consonant with the recitals of the following claims.

In the claims:

1. Apparatus comprising, first and second closure means for a pressurizing chamber bounded at opposite ends by respective ones of said means and contractable between said ends by relative movement between said two means, press means by which an actuating pressure is applicable to said first means and by which said chamber is so contractable with the aid of such pressure to impart hydrostatic pressure to a liquid in said chamber, stem means extending from said first means through said chamber into aperture means in said second means, said first means and stem means conjointly comprising pressure multiplier means to convert said actuating pressure into a greater hydrostatic pressure of said liquid with the portion of said stem means in said chamber being in contact throughout its length with the liquid in said chamber, seal means for said aperture means against said hydrostatic pressure, and means rendering utilizable said hydrostatic pressure.

2. Apparatus as in claim 1 in which said utilization means comprises die means through which billet material is hydrostatically extrudable from said chamber by said pressurized liquid.

3. Apparatus as in claim 2 in which at least part of said die means is positionally fixed relative to said second closure means.

4. Apparatus as in claim 2 in which said die means is positionally fixed relative to said stem means.

5. Apparatus as in claim 1 in which said stem means is of tubular configuration and has at least one passage for flow of liquid in said chamber between the inside and the outside of said tubular configuration.

6. Apparatus as in claim 5 in which said stem means comprises a perforated tubular sleeve.

7. Apparatus as in claim 1 in which said stem means comprises at least one stem rod and in which said aperture means comprises a centrally open aperture in which said stem rod is slidably received.

8. Apparatus as in claim 7 in which said stem rod and aperture are centrally disposed within said chamber.

9. Apparatus as in claim 1 in which the front end of said stem means is exposed to atmospheric pressure.

10. Apparatus as in claim 1 further comprising auxiliary press means disposed at the front end of said stem means to apply to such end a pressure appropriate to reduce to a safe value the tensile stress induced in said stem means by the Bridgman pinch-off effect.

11. Apparatus comprising, casing means having an interior bore and an end closure for said bore, piston means slidably received in said bore and having a front end axially spaced from said closure by a pressurizing chamber formed in said bore, press means by which an actuating pressure is applicable to the rear of said piston means and by which said piston means and closure are relatively movable towards each other with the aid of such pressure to contract said chamber so as to impart hydrostatic pressure to a liquid in said chamber, stem means extending from said piston means through said chamber into aperture means in said closure, said piston means and stem means conjointly comprising pressure multiplier means to convert said actuating pressure into a greater hydrostatic pressure of said liquid with the portion of said stem means in said chamber being in contact throughout its length with the liquid in said chamber, seal means for said aperture means against said hydrostatic pressure, and means rendering utilizable said hydrostatic pressure.

12. Apparatus as in claim 11 in which said press means comprises, means forming behind said piston means a hydraulic chamber for which the rear end of said piston means provides a movable end closure, and means to fill such chamber with pressurized hydraulic fluid.

13. Apparatus as in claim 12 in which said hydraulic chamber and said rear end of said piston means are of greater diameter than said front end of said piston means so as to provide a pressure multiplying effect supplementing that provided by said pressure multiplier means.

14. Apparatus as in claim 12 in which said pressurizing and hydraulic chambers are both provided by said bore, and in which said piston means is slidable within said bore over an axial length of said bore greater than the axial length of said piston means.

References Cited

UNITED STATES PATENTS

| 2,337,804 | 12/1943 | Dempsey | 72—265 |
| 2,920,760 | 1/1960 | Genders | 72—259 |

FOREIGN PATENTS

| 466,785 | 6/1937 | Great Britain. |
| 476,793 | 9/1951 | Canada. |

RICHARD J. HERBST, *Primary Examiner.*

H. C. DECKER, *Assistant Examiner.*